A. H. DANIELS.
Bale Band Shears.

No. 87,328.

Patented March 2, 1869.

Witnesses
N. Southard
Fannie M. Daniels

Inventor
Albert H. Daniels

ALBERT H. DANIELS, OF MANCHESTER, NEW HAMPSHIRE.

Letters Patent No. 87,328, dated March 2, 1869.

IMPROVED BALE-BAND SHEARS.

The Schedule referred to in these Letters Patent and making part of the same.

*To all whom it may concern:*

Be it known that I, ALBERT H. DANIELS, of Manchester, county of Hillsborough, State of New Hampshire, have invented a new and useful Improvement in Shears for Cutting Bale-Bands; and I do hereby declare that the following is a clear, full, and exact description thereof, which will enable others skilled in the art to make and use the same, reference being had to the accompanying drawings, forming a part of this specification, in which—

Figure 1:
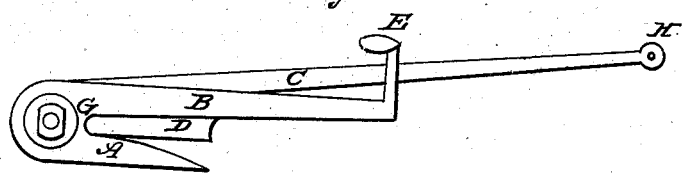
Figure 1 represents the shears complete, with their several parts adjusted.
Figure 2:
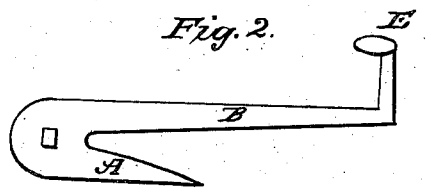
Figure 2 represents an elevation of the under blade.
Figure 3:
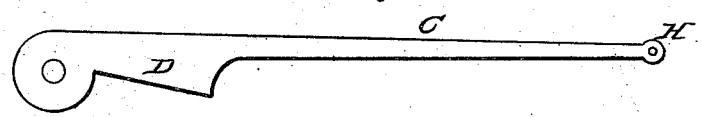
Figure 3 represents an elevation of the upper or right-hand blade.
Figures 4, 5:
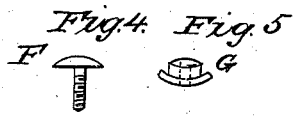
Figure 4 represents the round-headed bolt, passing through the eye in each blade, and securing them in opposition to each other.

Figure 5, the nut belonging to the bolt.

Similar letters of reference indicate like parts.

This invention relates to shears peculiarly adapted for severing the metallic bands which are used to secure cotton, wool, or other materials, when packed in bales.

The method heretofore adopted has been to cut the bands by means of a cold-chisel and hammer. This, at times, is rendered extremely difficult, and sometimes impossible, from the elastic character of the contents of the bales, and ordinary shears fail to accomplish the purpose, as, when the points are thrust forward and under the bands, the pressure is so great as to cause them to continually slip out again.

It will be seen, on reference to the drawings, that the point of the under blade of my shears is drawn under the band, and, by a steady traction with the left hand, which is thrust through the handle of the under blade, (placed at a right angle to the upper blade,) while, at the same time, a firm downward movement of the upper blade is made with the right hand, the band is easily severed, without damage to or risk of injury to the contents of the bale.

The blades are of steel, either welded to or forged with the handles.

At the outer end of the handles C, an eye, H, is formed, to allow the shears to be suspended from a nail or hook, when not in use.

Having thus described my invention,

I claim as new, and desire to secure by Letters Patent—

The combination of the blades A D and handles B, E, and C, substantially as and for the purpose specified.

The above specification of my invention signed by me, this 13th day of June, 1868.

ALBERT H. DANIELS.

Witnesses:
SAMUEL UPTON,
H. B. FAIRBANKS.